(12) United States Patent
Extrand et al.

(10) Patent No.: US 8,028,722 B2
(45) Date of Patent: Oct. 4, 2011

(54) FLUID HANDLING DEVICE WITH DIRECTIONALLY-BIASED WETTING SURFACE

(75) Inventors: Charles W. Extrand, Minneapolis, MN (US); Michael Wright, Portland, OR (US)

(73) Assignee: Entegris, Inc., Billerica, MA (US)

( * ) Notice: Subject to any disclaimer, the term of this patent is extended or adjusted under 35 U.S.C. 154(b) by 666 days.

(21) Appl. No.: 12/066,945

(22) PCT Filed: Sep. 15, 2006

(86) PCT No.: PCT/US2006/036081
§ 371 (c)(1),
(2), (4) Date: Oct. 7, 2008

(87) PCT Pub. No.: WO2007/035511
PCT Pub. Date: Mar. 29, 2007

(65) Prior Publication Data
US 2009/0217981 A1    Sep. 3, 2009

Related U.S. Application Data

(60) Provisional application No. 60/872,426, filed on Sep. 16, 2005, provisional application No. 61/066,139, filed on Sep. 16, 2005, provisional application No. 60/999,773, filed on Sep. 16, 2005.

(51) Int. Cl.
*F15D 1/00* (2006.01)
*H01M 8/02* (2006.01)
*B08B 3/00* (2006.01)

(52) U.S. Cl. .......... 138/39; 137/1; 134/22.1; 134/22.18; 134/23; 429/483; 429/499; 429/516

(58) Field of Classification Search ........................ None
See application file for complete search history.

(56) References Cited

U.S. PATENT DOCUMENTS

| 6,845,788 | B2 | 1/2005 | Extrand |
| 6,852,390 | B2 | 2/2005 | Extrand |
| 6,911,276 | B2 | 6/2005 | Extrand |
| 6,923,216 | B2 | 8/2005 | Extrand et al. |
| 6,976,585 | B2 | 12/2005 | Extrand |

*Primary Examiner* — Robert Hodge
(74) *Attorney, Agent, or Firm* — Patterson Thuente Christensen Pederson P.A.

(57) ABSTRACT

A fluid handling device with an anisotropic wetting surface including a substrate with a multiplicity of asymmetric substantially uniformly shaped asperities thereon. Each asperity has a first asperity rise angle and a second asperity rise angle relative to the substrate. The asperities are structured to present a desired retentive force ratio ($f_1/f_2$) greater or less than unity caused by asymmetry between the first asperity rise angle and the second asperity rise angle according to the formula: $f_3/f_2 = \sin(\omega_3 + \frac{1}{2}\Delta\theta_0)/\sin(\omega_2 + \frac{1}{2}\Delta\theta_0)$.

20 Claims, 11 Drawing Sheets

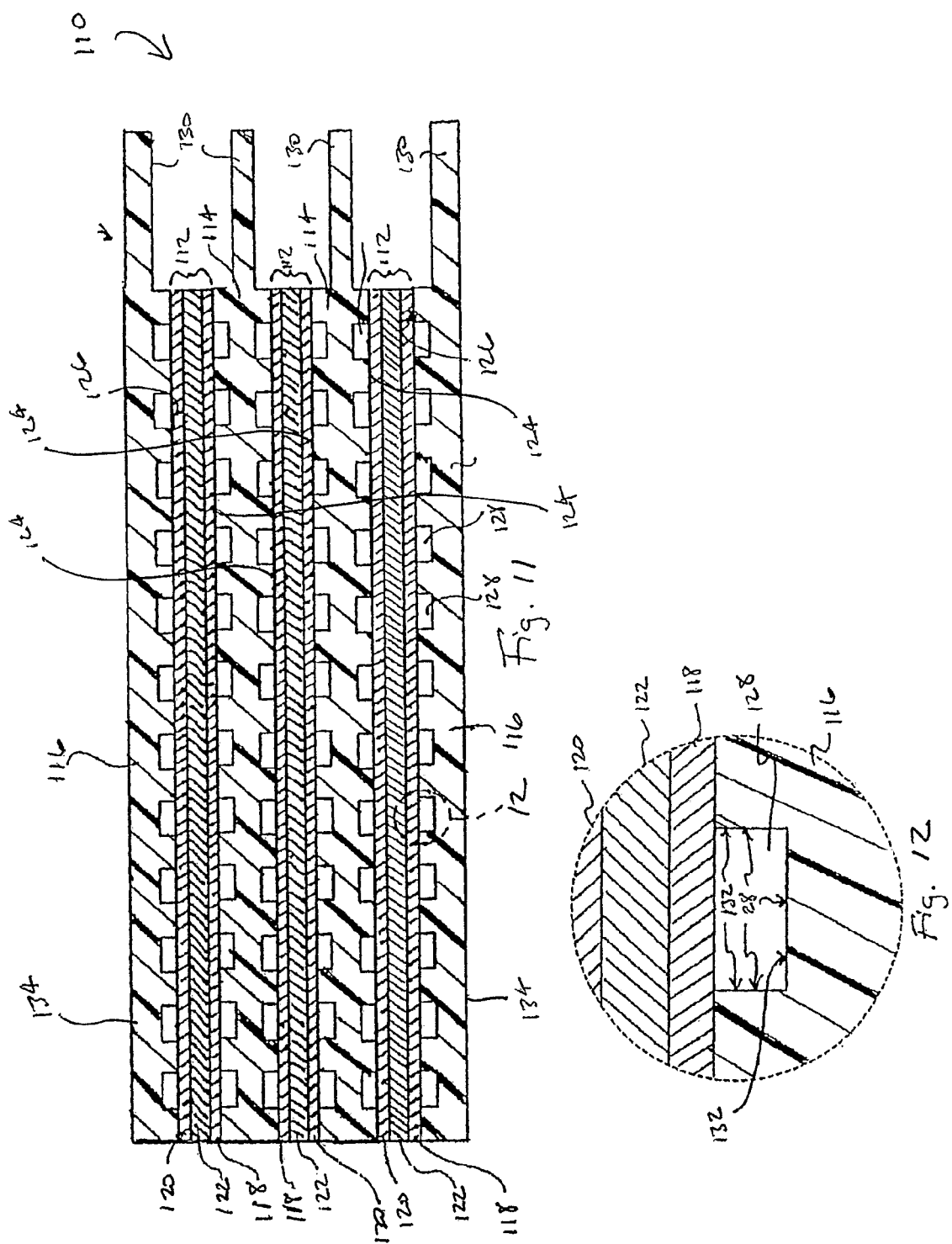

FLUID HANDLING DEVICE WITH DIRECTIONALLY-BIASED WETTING SURFACE

RELATED APPLICATIONS

This application is the National Stage Entry of International Application No. PCT/US2006/036081, which claims the benefit of U.S. provisional application Ser. Nos. 60/872,426, entitled FLUID HANDLING DEVICE WITH DIRECTIONALLY-BIASED WETTING SURFACE, 61/066,139, entitled MICROFLUIDIC DEVICE WITH ANISOTROPIC WETTING SURFACES, and 60/999,773, entitled FUEL CELL WITH ANISOTROPIC WETTING SURFACES, all filed Sep. 16, 2005, and all hereby fully incorporated herein by reference.

FIELD OF THE INVENTION

This invention relates generally to fluid handling devices and more specifically to wetted surfaces of fluid handling devices.

BACKGROUND OF THE INVENTION

Many industrial processes involve the interaction of liquids with solid surfaces. Often, it is desirable to control or influence the manner of the interaction, particularly the degree of wetting of the surface, so as to achieve a specific result. For example, surfactants are sometimes added to liquids used in cleaning processes so as to achieve greater surface wetting. In a converse example, liquid repellant coatings are sometimes added to clothing products to reduce surface wetting and accelerate drying of the clothing.

Efforts have been underway for decades to analyze and understand the principles and properties affecting surface wetting. There has been a particular interest in liquid "phobic" surfaces, which are surfaces that are resistant to wetting by liquids. Such surfaces may be referred to as hydrophobic where the liquid is specifically water, and lyophobic relative generally to water and all other liquids. If the surface resists wetting to an extent that a small droplet of water or other liquid exhibits a very high stationary contact angle with the surface (greater than about 120 degrees), if the surface exhibits a markedly reduced propensity to retain liquid droplets, or if a liquid-gas-solid interface exists at the surface when completely submerged in liquid, the surface may be generally referred to as an ultrahydrophobic or ultralyophobic surface. For the purposes of this application, the term ultraphobic is used to refer generally to both ultrahydrophobic and ultralyophobic surfaces.

Drainable surfaces are of special interest in commercial and industrial applications for a number of reasons. In nearly any process where a liquid must be dried from a surface, significant efficiencies result if the surface sheds the liquid without heating or extensive drying time. Often an appliance has a desired orientation for drying such that fluids are not retained in cavities or low spots due to the influence of gravity.

Moreover, friction between the liquid and the surface is dramatically lower for an ultraphobic surface as opposed to a conventional surface. As a result, directionally biased wetting surfaces are extremely desirable for reducing surface friction in certain directions and increasing flow in a myriad of hydraulic and hydrodynamic applications on a macro scale, and especially in microfluidic applications. In certain microfluidic applications it may be desirable for fluids to flow through a conduit with greater facility in one direction than an opposing direction. In other situations it may be desirable for fluids to be retained in a certain portion of an apparatus or for their flow rate to be reduced.

It is now well known that surface roughness has a significant effect on the degree of surface wetting. It has been generally observed that, under some circumstances, roughness can cause liquid to adhere more strongly to the surface than to a corresponding smooth surface. Under other circumstances, however, roughness may cause the liquid to adhere less strongly to the rough surface than the smooth surface. In some circumstances, surface roughness may cause the surface to demonstrate directionally biased wetting.

Efforts have been made previously at introducing intentional roughness on a surface to produce an ultraphobic surface. The roughened surface generally takes the form of a substrate member with a multiplicity of microscale to nanoscale projections or cavities, referred to herein as "asperities".

Wetting properties of surfaces can have significant impact relative to particular fluid handling products. For example, fluid management and wetting behavior in fuel cells has been the subject of much recent research. A persistent challenge in the design of fuel cells is that of managing water in the cell. Fuel cells produce water as a reaction product. Under some conditions, water is evolved very quickly within the cell. This water is generally produced on the cathode side of the cell, and if allowed to accumulate, may restrict or block the flow of fuel into the cell. Such a condition is known in the art as "cathode flooding". In addition, the temperature differences between the cell and ambient environment may be large so that condensation of water vapor may be caused at times as air moves in and out of the cell during operation.

Typically, the surface of bipolar plates is provided with drainage channels so that water is directed through the channels to a collection area to be drained from the cell. In addition, the bipolar plates are often made from material having relatively low surface energy so water drains from the bipolar plate more easily. Neither of these measures has been entirely successful in eliminating cathode flooding and water management problems in fuel cells, however. In particular, even where low surface energy materials such as PTFE are used in fuel cells, water droplets may cling to bi-polar plates and other surfaces in the cell rather than draining away as desired. What is needed in the industry is a fuel cell with components facilitating improved water drainage within the cell.

For another example, a significant factor in the design of a microfluidic device is the resistance to fluid movement imposed by contact of fluid with surfaces in the microscopic channels of the device. It may be desirable to control the flow of fluid within the microfuidic device so that fluids can flow more readily in one direction than in another direction. In general, reactants should flow into a microfluidic device at one or more entrances and products should flow out at one or more exits. Backwards flow can sometimes result in contamination of reactants or other problems. What is needed in the industry is a microfluidic device with fluid flow channels having predictable levels of anisotropic or directionally biased resistance to fluid flow.

SUMMARY OF THE INVENTION

In an embodiment, the invention includes a fluid handling device having a durable generally lyophobic or ultraphobic surface that has anisotropic wetting qualities. That is, fluids will demonstrate a variable resistance to flow across the surface depending on the direction in which they flow. The anisotropic wetting surface generally includes a substrate portion with a multiplicity of projecting asymmetrical regularly shaped microscale or nanoscale asperities. For the purposes of this application, fluid handling devices include pipe, tubing, fittings, valves, flowmeters, tanks, pumps, wetted fuel cell components, microfluidic devices and components, and any other device or component that may be used to handle, transport, contain, or convey a fluid. Fluid handling devices may also include pipettes, burettes, flasks, beakers, tubing, nozzles, fittings and other devices that are used to measure and transfer fluids in a laboratory or manufacturing process environment.

The asperities may be formed in or on the substrate material itself or in one or more layers of material disposed on the surface of the substrate. The asperities may be any regularly or irregularly shaped three dimensional solid or cavity and may be disposed in any regular geometric pattern or randomly.

Microscale asperities according to the invention may be formed using known molding and stamping methods by texturing the tooling of the mold or stamp used in the process. The processes could include injection molding, extrusion with a textured calendar roll, compression molding tool, or any other known tool or method that may be suitable for forming microscale asperities.

Smaller scale asperities may be formed using photolithography, or using nanomachining, microstamping, microcontact printing, self-assembling metal colloid monolayers, atomic force microscopy nanomachining, sol-gel molding, self-assembled monolayer directed patterning, chemical etching, sol-gel stamping, printing with colloidal inks, or by disposing a layer of parallel carbon nanotubes on the substrate.

The creation of asymmetric asperities can directionally bias the fluid retentiveness of a surface. This approach can be applied to flat surfaces as well as curved surfaces such as tubes or troughs. Directionally biased fluid retention can be incorporated into conventionally wetting surfaces as well as ultraphobic surfaces. The asymmetric features can be random or periodic in design. Periodic asperities may vary in two dimensions such as structured stripes, ridges, troughs or furrows. Periodic asperities may also vary in three dimensions such as posts, pyramids, cones or holes. The size, shape, spacing and angles of the asperities can be tailored to achieve a desired anisotropic wetting behavior.

Generally, anisotropic wetting qualities are effective with droplets on surfaces and slugs within tubes, troughs or channels. Surfaces having anisotropic wetting qualities can be used to ensure that small droplets or slugs of liquid drain fully from the surface or, alternately, can be used to help ensure that droplets or slugs are retained so that there is less risk of dripping at the end of a pouring or draining process.

BRIEF DESCRIPTION OF THE DRAWINGS

FIG. 11 is a simplified cross-sectional view of a fuel cell stack apparatus with anisotropic fluid contact surfaces according to the present invention;

FIG. 12 is an enlarged partial view of the fuel cell stack apparatus of FIG. 11, depicting one channel in the apparatus;

DETAILED DESCRIPTION OF THE INVENTION

For the purposes of this application, fluid handling devices include pipe, tubing, fittings, valves, flowmeters, tanks, pumps, wetted fuel cell components, microfluidic devices and components, and any other device or component that may be used to handle, transport, contain, or convey a fluid. Fluid handling devices may also include pipettes, burettes, flasks, beakers, tubing, nozzles, fittings or other devices that are used to measure or transfer fluids in a laboratory or manufacturing process environment such as heat or mass exchange devices, including without limitation, filters, heat exchangers and components thereof. The term "fluid contact surface" refers broadly to any surface or portion thereof of a fluid handling component that may be in contact with a fluid. The term "fluid handling system" refers to any fluidly interconnected arrangement of fluid handling components.

Figure 1:
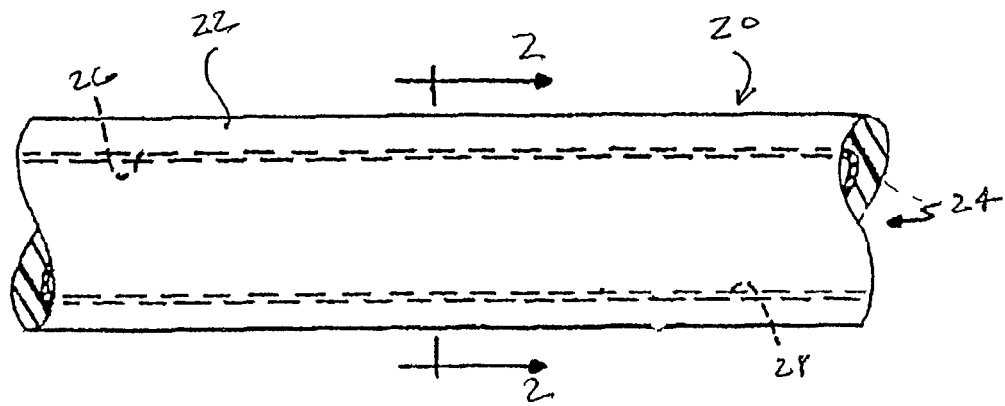
FIG. 1 is a partial longitudinal sectional view of a length of tubing with an anisotropic fluid contact surface according to the present invention.
Figure 2:
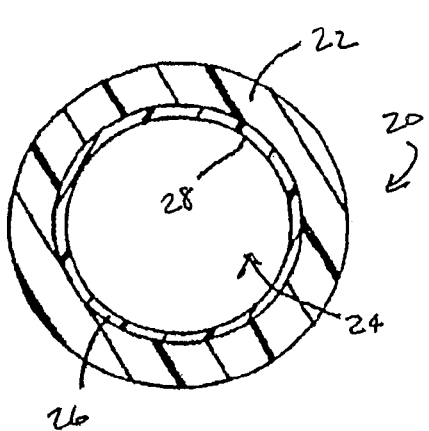
FIG. 2 is a cross-sectional view of the length of tubing depicted in FIG. 1 taken along section line 2-2.

Various embodiments of fluid handling components according to the present invention are depicted in FIGS. 1-12. In FIGS. 1 and 2, a length of tubing 20 generally includes body 22 defining bore 24 for the transport of fluid. Substrate layer 26 is disposed so as to line bore 24. Anisotropic wetting fluid contact surface 28 is formed on substrate layer 26 and faces inwardly so as to contact fluid flowing through bore 24. Substrate layer 26 may be applied to body 22 by film insert molding as disclosed in co-pending U.S. patent application Ser. No. 10/304,459, entitled "Performance Polymer Film Insert Molding for Fluid Control Devices", commonly owned by the owners of the present invention and hereby incorporated fully by reference herein. Although a separate substrate layer 26 is depicted in the embodiment of FIGS. 1 and 2, it will be readily appreciated that in other embodiments, body 22 may serve as the substrate, with anisotropic wetting fluid contact surface 28 formed directly on an inwardly facing surface thereof. It will also be appreciated that anisotropic wetting fluid contact surface may run the entire length of tubing 20 or may be selectively positioned at any desired point where flow conditions may be critical.

Figure 3:
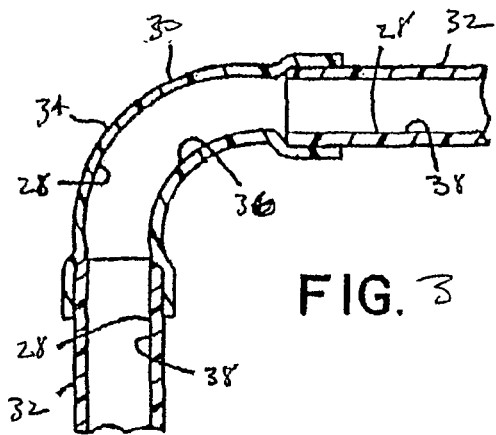
FIG. 3 is a partial longitudinal sectional view of a 90 degree elbow fitting according to the present invention connecting two sections of pipe.

Another embodiment of a fluid handling component in the form of a 90 degree elbow fitting 30 connecting two lengths of pipe 32 is depicted in FIG. 3. Elbow fitting 30 generally includes body portion 34 with anisotropic wetting fluid contact surface 28 directly on inner surface 36. Inner surface 38 of each pipe 32 may also be an anisotropic wetting contact surface 28. It will, of course, be readily appreciated that anisotropic wetting fluid contact surface 28 may be provided on pipe, tubing, fittings and channels of any shape or size. For example, although a 90 degree elbow fitting is depicted in FIG. 3 herein, other fittings such as sweep elbows, tees, wye and sanitary fittings, manifolds and the like may also be provided with anisotropic wetting fluid contact surfaces according to the present invention.

Figure 5:
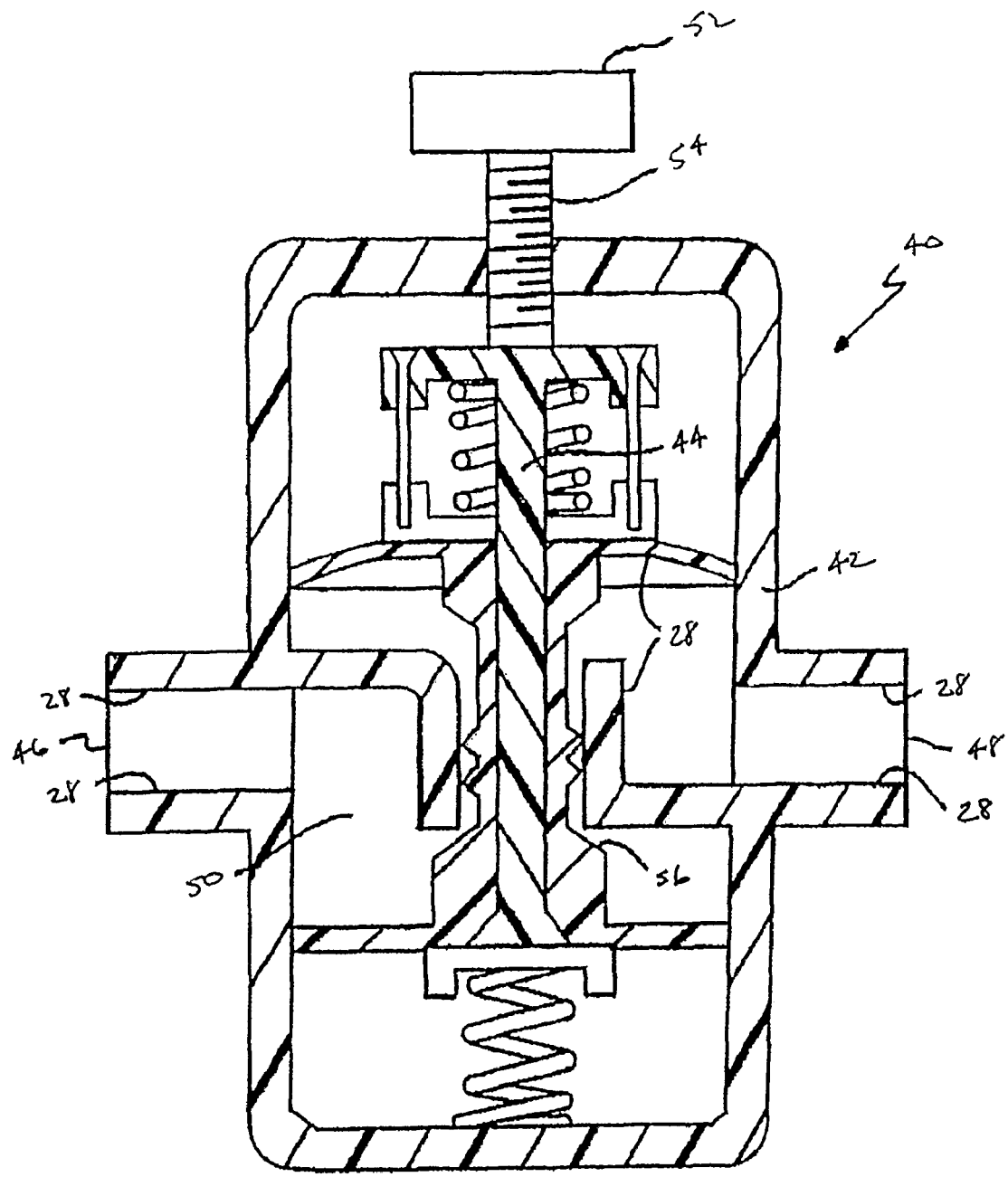
FIG. 5 is a sectional view of a two-way valve component according to the present invention.

In addition, other more complex fluid handling components, such as two-position valve 40 depicted in FIG. 5, may be provided with anisotropic wetting fluid contact surfaces 28. Two-position valve 40 generally includes valve body 42 and valve stem 44. Valve body 42 generally includes inlet port 46 and an outlet port 48 connected by continuous flow channel 50. Valve stem 44 includes handle 52, rod 54 and sealing face 56. Anisotropic wetting fluid contact surface 28 may be formed on the entire wetted surface of two-position valve 40 including inlet port 46, outlet port 48 and flow channel 50 or any desired portion thereof with orientation to promote drainage. Anisotropic wetting fluid contact surface 28 may also formed on the wetted portions of valve stem 44.

Figure 4:
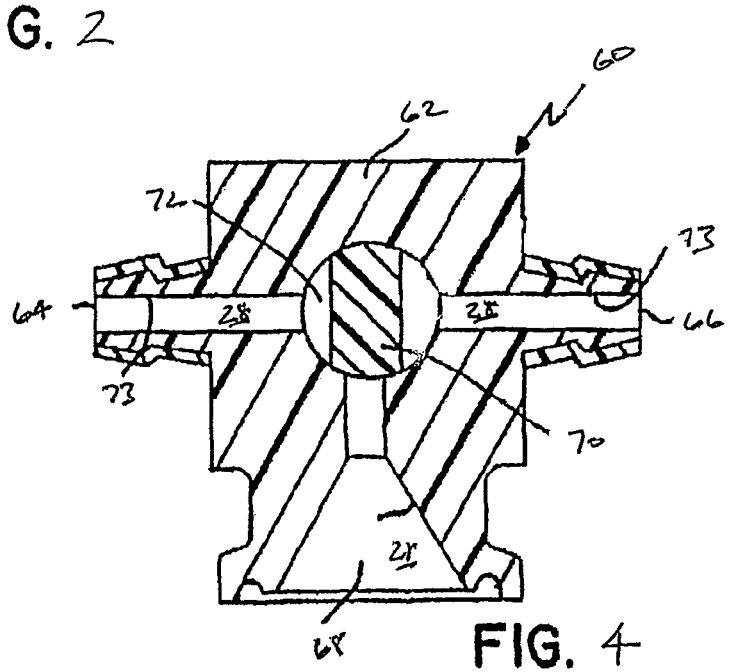
FIG. 4 is a sectional view of a three-way valve component according to the present invention.

Another alternative embodiment of a fluid handling component is depicted in FIG. 4. In FIG. 4, a three-position valve 60 includes a valve body 62 having an inlet port 64, a first outlet port 66 and a second outlet port 68. Three-position valve 60 also includes valve stem 70 within central bore 72. First outlet port 66 and second outlet port 68 are configured having barbed ends 73 facilitating interconnection to the remainder of a fluid circuit. Again, anisotropic wetting fluid contact surface 28 may be formed over the entire wetted surface of valve body 62 and valve stem 70, or selectively on any portion thereof.

It will be evident that anisotropic wetting fluid contact surface 28 may be applied to any valve configuration. These configurations could include any number of inlet and outlet ports, all variety of valve connections including male and female, threaded style connectors and, sanitary connectors. In addition, anisotropic wetting fluid contact surfaces according to the present invention may be selectively applied to the wide variety of valve stems including those used in ball valves, gate valves, and diaphragm valves to facilitate drainage or otherwise bias or direct fluid movement.

Figure 6:
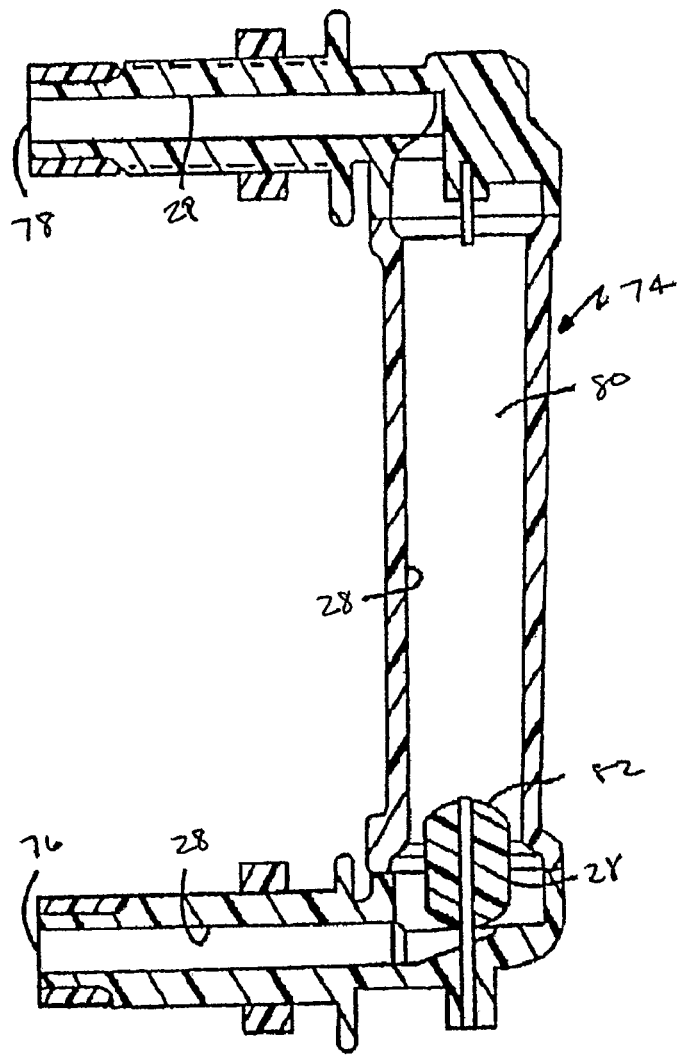
FIG. 6 is a sectional view of an in-line flowmeter component according to the present invention.
Figure 7:
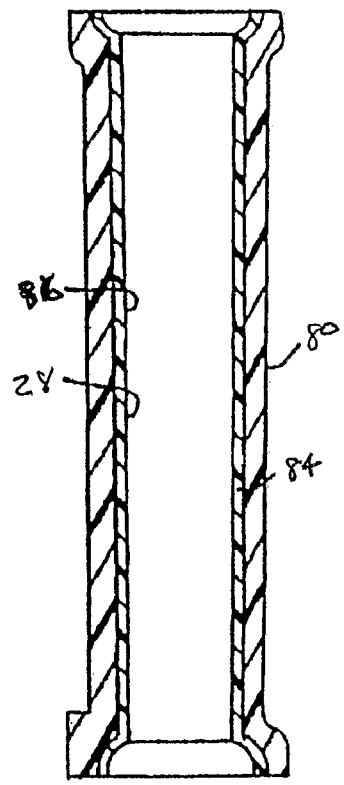
FIG. 7 is a sectional view of an in-line flowmeter sight tube according to the present invention.

As depicted in FIGS. 6 and 7, the fluid handling component may be in the form of a flowmeter assembly 74. Flowmeter assembly 74 generally includes inlet port 76, outlet port 78, sight tube 80 and float 82. In the depicted embodiment, anisotropic wetting fluid contact surface 28 is formed on all wetted surfaces of flowmeter assembly 74. In the alternative embodiment depicted in FIG. 7, sight tube 80 has interior substrate layer 84, with anisotropic wetting fluid contact surface 28 on the interior surface 86 of substrate layer 84. It will be appreciated that anisotropic wetting fluid contact surfaces 28 may be applied to any type of fluid monitoring apparatus, including flowmeters having sensors for transmitting fluid flow data. In such an embodiment, anisotropic wetting fluid contact surface 28 may be formed on a sensor utilizing a paddle wheel, turbine, magnet or other flow sensing device commonly used in industry.

In sum, it will be appreciated that anisotropic wetting fluid contact surface 28 may be applied to any fluid handling component where such properties may be desirable. Other examples of fluid handling components may include fluid moving devices such as pumps, nozzles, weirs, and hydraulic components such as cylinders. It will also be readily appreciated that anisotropic wetting fluid contact surface 28 of the present invention may be advantageously applied to microfluidic fluid handling components.

For the purposes of the present application, the term "microfluidic fluid handling components" refers broadly to any other device or component that may be used to contact, handle, transport, contain, process, or convey a fluid, wherein the fluid flows through one or more fluid flow channels of microscopic dimensions. For the purposes of the present application, "microscopic" means dimensions of 500 µm or less.

Figure 8:
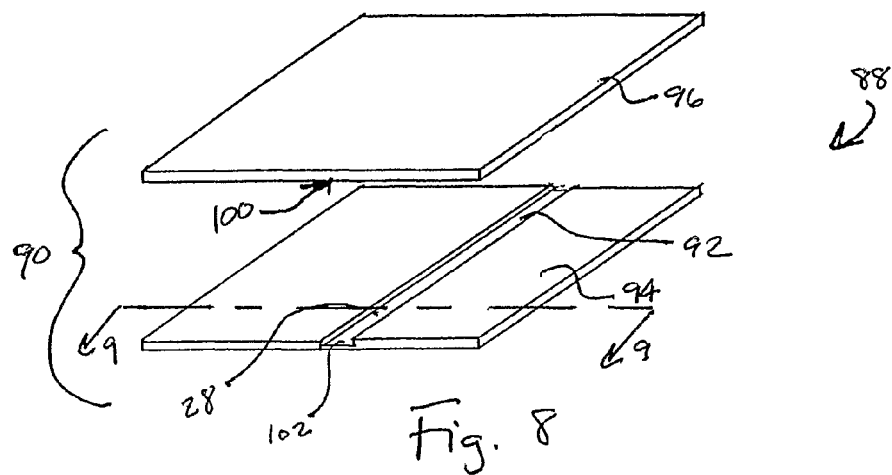
FIG. 8 is an exploded view of a microfluidic device with an anisotropic wetting fluid contact surface according to the present invention.
Figure 9:
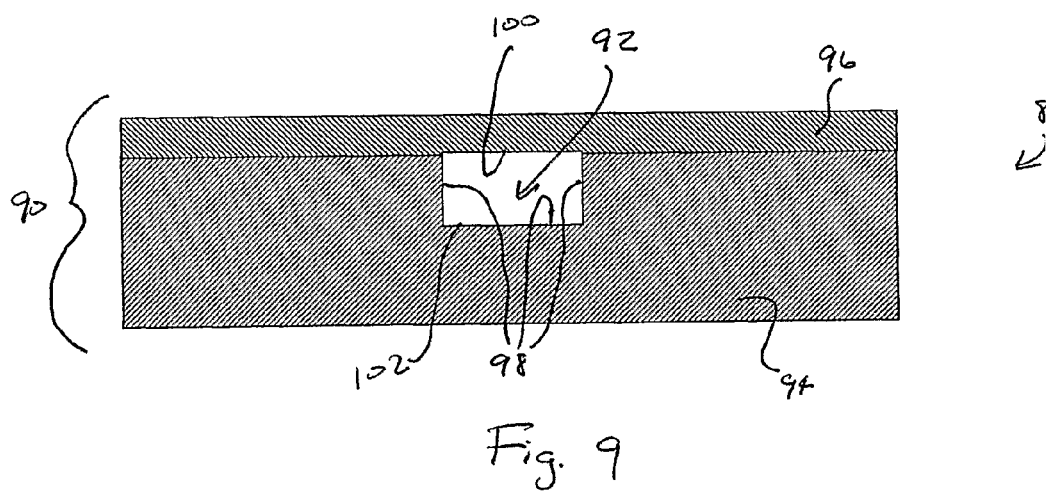
FIG. 9 is a cross-sectional view of the device of FIG. 8, taken at section 9-9 of FIG. 8.

A microfluidic device 88 according to the present invention is depicted in a greatly enlarged, exploded view in FIG. 8. Device 88 generally includes body 90 with rectangular flow channel 92 defined therein. Body 90 generally includes main portion 94 and cover portion 96. Flow channel 92 is defined on three sides by inwardly facing surfaces 98 on main portion 94 and on a fourth side by an inwardly facing surface 100 on cover portion 96. Surfaces 98 and surface 100 together define channel wall 102 as depicted in FIGS. 8 and 9.

According to the present invention, all or any desired portion of channel wall 102 may be provided with an anisotropic wetting fluid contact surface 28. Although a two-piece configuration with rectangular flow channel is depicted in FIG. 8, it will of course be readily appreciated that microfluidic device 88 may be formed in any other configuration and with virtually any other flow channel shape or configuration, including a one piece body with a cylindrical, polygonal, or irregularly shaped flow channel formed therein.

Figure 10:
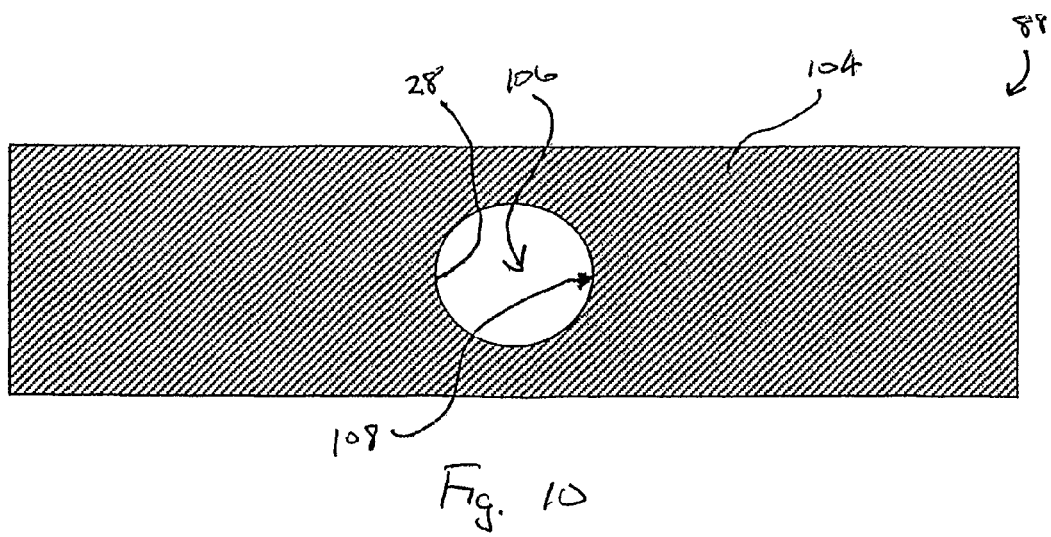
FIG. 10 is an alternative embodiment of a microfluidic device according to the present invention.

An alternative embodiment of a microfluidic device 88 is depicted in cross-section in FIG. 10. In this embodiment, body 104 is formed in one integral piece. Cylindrical flow channel 106 is defined within body 104, and has a channel wall 108 presenting anisotropic wetting fluid contact surface 28 facing into flow channel 106.

It will be further appreciated that the present invention has particular application in fluid management within fuel cells. For the purposes of this application, the term "fuel cell"

means any electrochemical fuel cell device or apparatus of any type, including but not limited to proton exchange membrane fuel cells (PEMFC), alkaline fuel cells (AFC), phosphoric acid fuel cells (PAFC), molten carbonate fuel cells (MCFC), and solid oxide fuel cells (SOFC). The term "fuel cell stack apparatus" refers to an apparatus including at least one fuel cell and any and all components thereof, along with any and all of the separate components related to the functioning of the fuel cell, including but not limited to, enclosures, insulation, manifolds, piping, and electrical components.

A portion of an embodiment of a fuel cell stack apparatus 110 according to the present invention is depicted in simplified cross section in FIG. 11. Fuel cell stack apparatus 110 generally includes membrane electrode assemblies 112, which are separated by bipolar plates 114. End plates 116 contain the apparatus 110 at each end. Each membrane electrode assembly 112 generally includes an anode membrane structure 118, a cathode membrane structure 120, and an electrolyte 122.

Bipolar plates 114 and end plates 116 are typically made from electrically conductive, corrosion and heat resistant material such as metal or carbon filled polymer. Surfaces 124 of bipolar plates 114 and the inwardly facing surfaces 126 of end plates 116 typically define channels 128 for conveying fuel and oxidant to membrane electrode assemblies 112 and to drain away water which is a product of the reaction. Heat transfer portions 130 of bipolar plates 114 and end plates 116 may provide additional surface area to remove heat from the cells.

According to the invention, all or any desired portions of the outer surfaces of bipolar plates 114 or end plates 116 may be anisotropic wetting surfaces 28. As depicted in FIG. 12 for example, anisotropic wetting surfaces 28 may be provided on the inwardly facing surfaces 132 of channels 128 to improve water drainage in the channels 128. Water droplets evolved during the reaction process will flow more easily in a desired direction on the anisotropic wetting surfaces 28, causing the water to drain from the channels 128 by gravity.

As depicted in FIG. 11, other portions of the bipolar plates 114 or end plates 116, such as heat transfer portions 130 and outer surfaces 134, may also be provided with anisotropic wetting surfaces 28 to improve drainage of water collecting or condensing on these surfaces. Other components of the fuel cell stack assembly, such as fuel and oxidant manifolds and piping (not depicted), vents (not depicted), and enclosure surfaces (not depicted) may be provided with anisotropic wetting surfaces 28 to drain water that may condense on these components due to the movement of humid gases between the ambient environment and the elevated temperatures within the cell. It will be readily appreciated that an anisotropic wetting surface 28 according to the invention may be provided on any desired portion of any fuel cell stack apparatus component in order to improve the water drainage characteristics thereof.

Figure 13A:
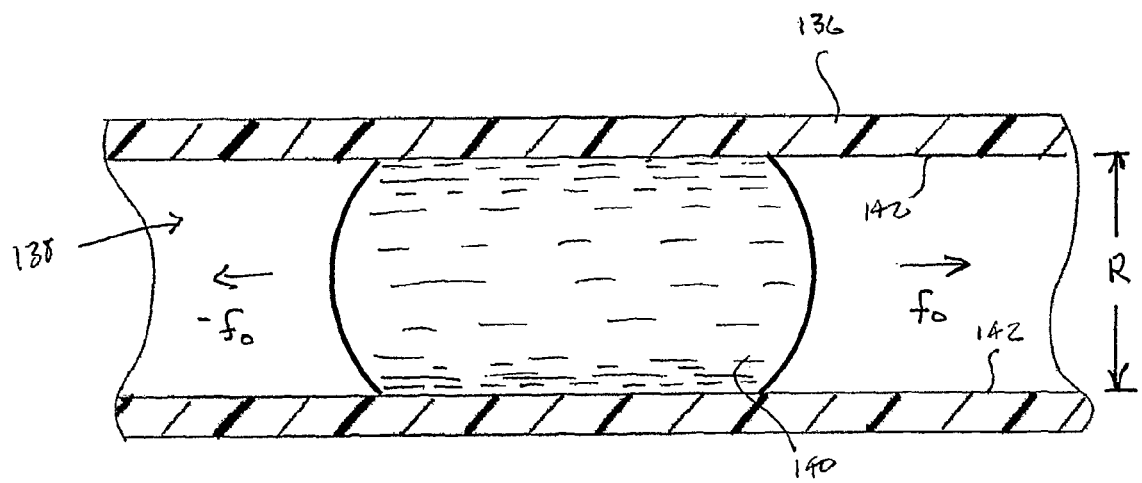
FIG. 13a is a cross-sectional view of a capillary tube with smooth wall surface.
Figure 13B:
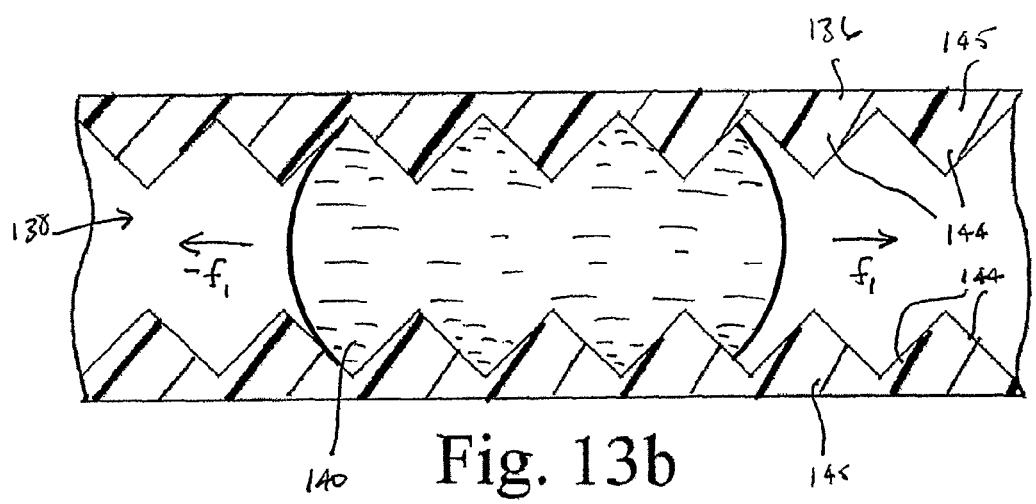
FIG. 13b is a cross-sectional view of a capillary tube with a wall surface having symmetrical asperities.
Figure 13C:
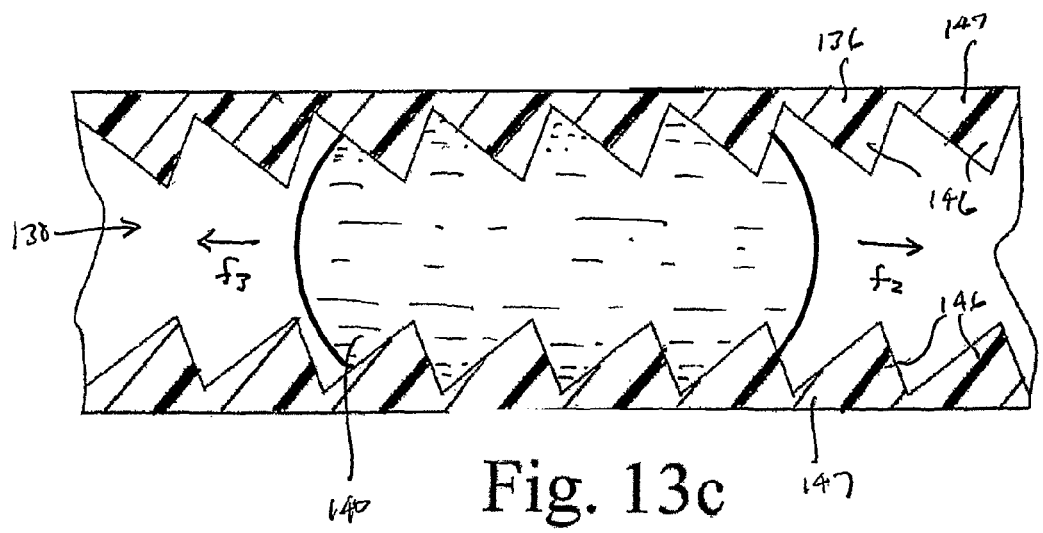
FIG. 13c is a cross-sectional view of a capillary tube with a wall surface having asymmetrical asperities.

Turning now to an understanding of the structure of anisotropic wetting fluid contact surfaces, cylindrical capillary tubes 136, each defining a flow channel 138 containing a liquid slug 140 are depicted in longitudinal cross-section in FIGS. 13a-c for illustrative purposes. FIG. 13a depicts flow channel 138 of capillary 136 as having a relatively smooth wall surface 142. FIG. 13b depicts flow channel 138 with generally symmetrical saw tooth features 144 on wall 145, the saw tooth features 144 being greatly exaggerated in size for purposes of clarity. FIG. 13c depicts flow channel 138 with asymmetrical saw tooth features 146 on wall 147 forming an anisotropic wetting surface 28 according to an embodiment of the invention, with the asymmetrical saw tooth features 146 again being greatly exaggerated in size for purposes of clarity.

In the smooth tube 136 of FIG. 13a, the retention force $-f_0$ resisting movement of slug 140 to the left is equal to the retention force $f_0$ resisting movement to the right. Similarly, in the tube with symmetrical features 144 of FIG. 13b, the retention force $-f_1$ resisting movement of slug 140 to the left is equal to the retention force $f_1$ resisting movement to the right. For the tube with asymmetrical features 146 depicted in FIG. 13c, however, with fluid flow generally transverse to the peaks and valleys formed by the features 146, the retention force $f_3$ resisting movement of slug 140 to the left is less by a measurable degree than the retention force $f_2$ resisting movement to the right. As will be discussed in more detail hereinbelow, this difference in retention force is determined by the geometry of the surface features. By disposing asymmetrical surface features according to predetermined relationships as described herein, the difference in retention force produces an anisotropic wetting fluid contact surface.

Figure 14:
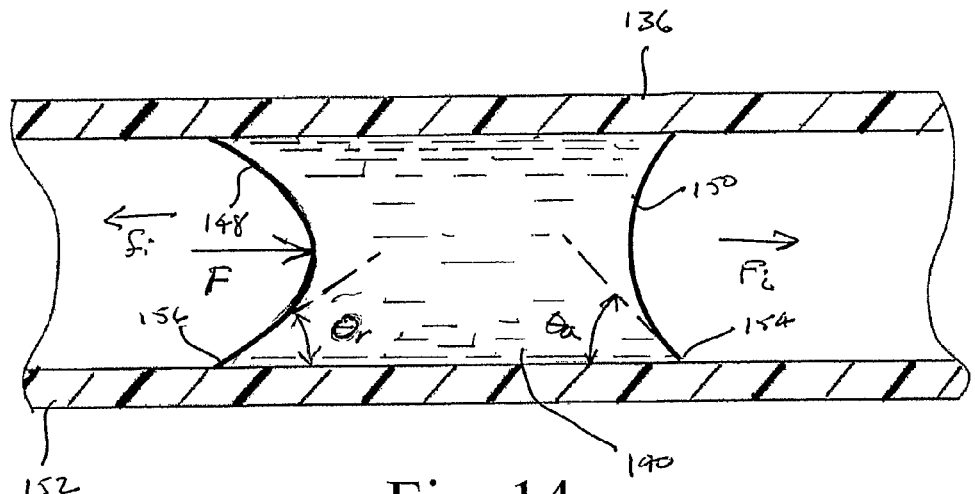
FIG. 14 is a cross-sectional view of a liquid slug in a capillary tube, where the slug is under the influence of an external force.

It will be appreciated that the liquid slugs 140 of FIGS. 13a-c, if free from the influence of external forces, will tend to remain stationary in the tubes 136 since there is no energy being applied to overcome inertia and friction. When an external force F is applied to slug 140, depicted in FIG. 14 in capillary tube 136 which has a radius R, the fluid-liquid interfaces 148, 150, distort with both interfaces 148, 150, deflecting in the direction of the applied force. This external force F could arise from, for example, inclination of the tube or fluid pressure applied to end 152 of the tube. Capillary forces present at the leading 154 and trailing 156 contact lines will tend to anchor slug 140, inhibiting movement, until the applied external force F exceeds a critical value, $F_i$. When this threshold is reached so that $F_i$ equals the retention force $f_i$, the distorted interfaces 148, 150, of slug 140 exhibit an advancing contact angle, $\theta_a$, at leading contact line 154 and a receding value, $\theta_r$, at trailing contact line 156. If the external force F is further increased such that $F_i > f_i$, slug 140 will begin to move in the direction urged by external force F.

The magnitude of the retention force, $f_i$, that resists incipient motion within a cylindrical capillary tube of radius R is determined by the fluid-liquid interfacial tension, $\gamma$, and the advancing and receding contact angles, $$f_i = k\gamma R(\cos\theta_r - \cos\theta_a), \quad (1)$$

where $$k = 2\pi. \quad (2)$$

If the surface is clean, smooth and free of defects, then the retention force can be expressed in terms of inherent contact angles, $\theta_{a,0}$ and $\theta_{r,0}$, $$f_0 = k\gamma R(\cos\theta_{r,0} - \cos\theta_{a,0}). \quad (3)$$

Figure 15A:
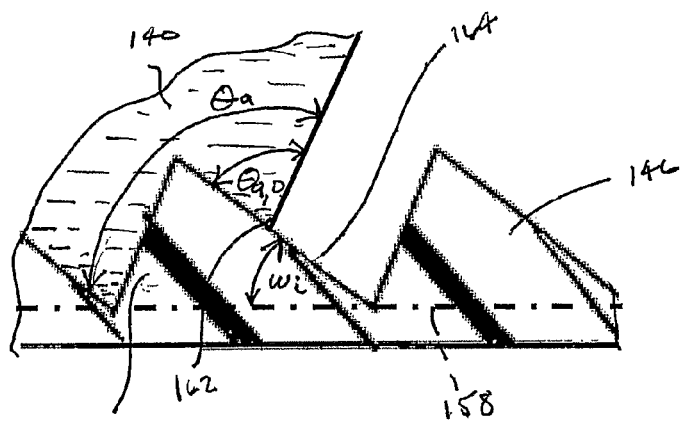
FIG. 15a is an enlarged side view of the contact line of a liquid slug interacting with a surface asperity or feature, wherein the contact line is advancing.
Figure 15B:
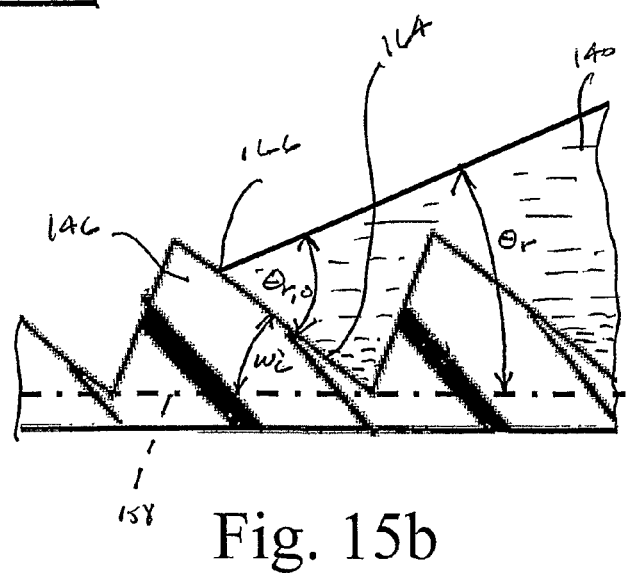
FIG. 15b is an enlarged side view of the contact line of a liquid slug interacting with a surface asperity or feature, wherein the contact line is receding.

Surface roughness generally increases retention force over that of a smooth surface. This increase arises from change in the contact angles due to their geometric interaction with surface asperities or features. Consider the contact line of a slug 140 interacting with a surface asperity or feature 146 on a substrate surface 158 as depicted in FIGS. 15a and 15b. The rise angle of feature 146 from the substrate surface 158 is denoted $\omega_i$. FIG. 15(a) depicts contact line 162 advancing across feature 146 with an apparent advancing contact angle of $\theta_a$. The liquid exhibits its true advancing contact angle value, $\theta_{a,0}$, on face 164 of feature 146. The difference between the apparent advancing contact angle, $\theta_a$, relative to the substrate surface 158 and true advancing angle, $\theta_{a,0}$, depends on the rise angle subtended by the feature, $\omega_i$. Interaction with feature 146 causes $\theta_a$ to increase such that, $$\theta_a = \theta_{a,0} + \omega_i. \quad (4)$$

FIG. 15(*b*) depicts a contact line 166 retreating across the same feature 146 with an apparent receding contact angle of $\theta_r$. The liquid exhibits its true receding value, $\theta_{r,0}$, on face 164 of feature 146. In contrast to the advancing case, interaction with the feature causes $\theta_r$ to decrease so that, $$\theta_r = \theta_{r,0} - \omega_i. \quad (5)$$

Figure 16A:
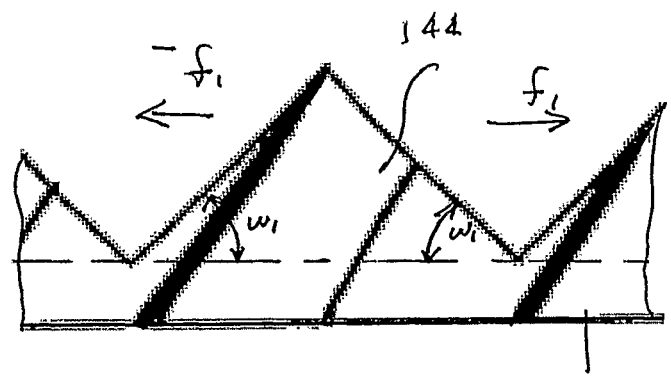
FIG. 16a is an enlarged fragmentary cross-sectional view of a capillary tube wall having symmetrical, generally saw-tooth shaped asperities.
Figure 16B:
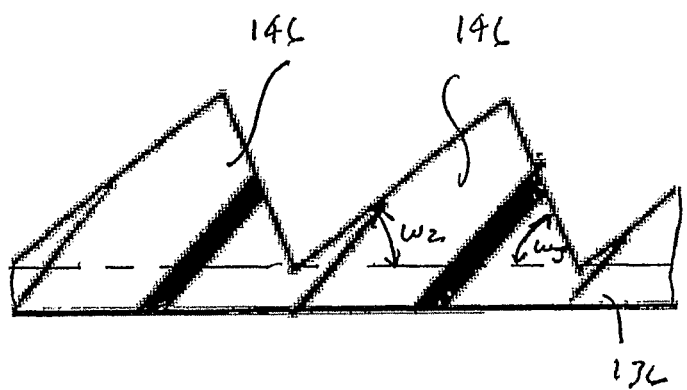
FIG. 16b is an enlarged fragmentary cross-sectional view of a capillary tube wall having asymmetrical, generally saw-tooth shaped asperities.

For purposes of example, it may be assumed that the features 144, 146, on the inner surface of capillary tube 136 takes the form of a saw tooth or ratchet pattern depicted in FIGS. 16*a* and 16*b*, and that the roughness in these tubes is radially symmetric (the features extend around the entire perimeter without variation in their cross-sectional shape). For symmetric features 144 with a rise angle of $\omega_1$ as portrayed in FIG. 16(*a*), the retention forces, $-f_1$ and $f_1$ are equal and wetting is isotropic. An expression for estimating $f_1$ comes from the combination of equations (1), (4) and (5), $$f_1 = k\gamma R[\cos(\theta_{r,0} - \omega_1) - \cos(\theta_{a,0} + \omega_1)], \quad (6)$$

If the inner surface of the capillary tube 136 has the asymmetric features 146 depicted in FIG. 16(*b*), then the magnitude of a retention force differential, $\Delta f$, or the difference between $f_3$ and $f_2$, may be expressed in terms of $\omega_2$ and $\omega_3$:

$$\Delta f = f_3 - f_2 = k\gamma R[\cos(\theta_{r,0} - \omega_3) - \cos(\theta_{a,0} + \omega_3) - \cos(\theta_{r,0} - \omega_2) + \cos(\theta_{a,0} + \omega_2)]. \quad (7)$$

Due to geometric limitations, $\theta_{r,0} - \omega_i$ must be $\geq 0°$ and $\theta_{a,0} + \omega_i$ must be $\leq 180°$. A number of trigonometric functions can be applied to separate terms and simplify these expressions. A general form of the retention force, $f_i$, $$f_i / k\gamma R = 2\sin[\frac{1}{2}(\theta_{r,0} + \theta_{a,0})]\sin(\omega_i + \frac{1}{2}\Delta\theta_0), \quad (8)$$

can be framed in terms of inherent hysteresis, $\Delta\theta_0$, $$\Delta\theta_0 = \theta_{a,0} - \theta_{r,0}, \quad (9)$$

and rise angles, $\omega_i$, where i=0 for a clean, smooth surface, with $\omega_0 = 0$; i=1 for a surface with symmetric saw tooth features where $\omega_1 > 0$; and i=2 or 3 for a surface with asymmetric features, $\omega_2 \neq \omega_3$. The retention force differential, $\Delta f$, from equation (7) that describes the tube with asymmetric roughness can be rewritten as $$\Delta f = f_3 - f_2 = 2k\gamma R\sin[\frac{1}{2}(\theta_{r,0} + \theta_{a,0})][\sin(\omega_3 + \frac{1}{2}\Delta\theta_0) - \sin(\omega_2 + \frac{1}{2}\Delta\theta_0)]. \quad (10)$$

Equation (8) also can be used to express retention forces as ratios. For example, retention forces of a capillary tube with symmetric saw tooth features to the corresponding tube contrasted with a smooth surface yields the ratio, $$f_1/f_0 = \sin(\omega_1 + \frac{1}{2}\Delta\theta_0)/\sin(\frac{1}{2}\Delta\theta_0). \quad (11)$$

In another example, a ratio of retention forces in a tube with asymmetric saw tooth features where the retention forces are diametrically opposed may be expressed as, $$f_3/f_2 = \sin(\omega_3 + \frac{1}{2}\Delta\theta_0)/\sin(\omega_2 + \frac{1}{2}\Delta\theta_0). \quad (12)$$

It will be appreciated that whenever this $f_3/f_2$, also known as retentive force ratio, exceeds or is less than unity, the surface will exhibit anisotropic wetting behavior, forming anisotropic wetting surface 28. The degree of anisotropic wetting decreases as the retentive force ratio approaches unity. At unity, wetting is isotropic.

Figure 16C:
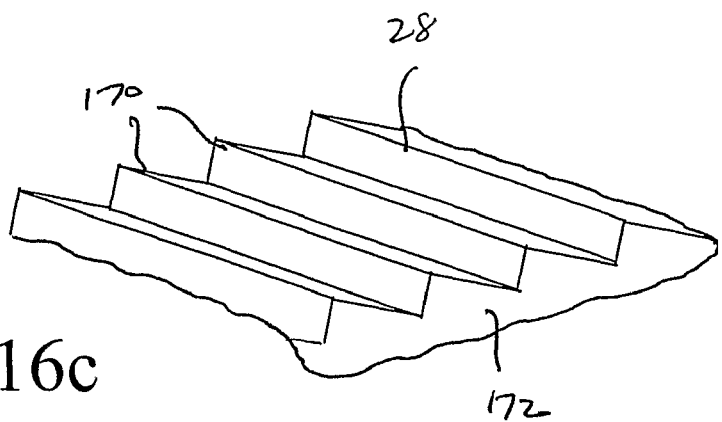
FIG. 16c is an enlarged fragmentary perspective view of an anisotropic fluid contact surface with asperities in the form of asymmetrical, generally saw-tooth shaped ridges.
Figure 16D:
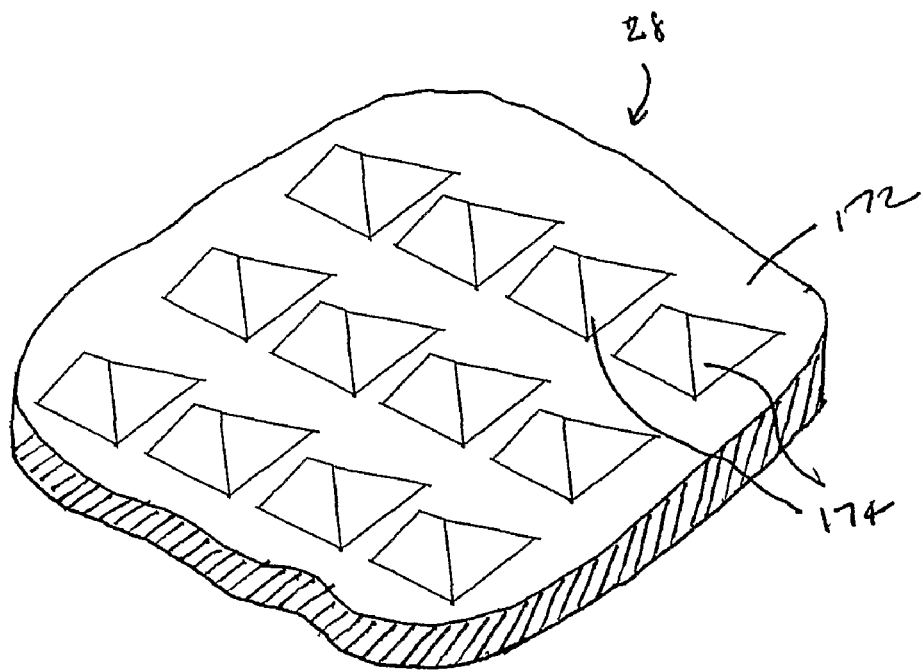
FIG. 16d is an enlarged fragmentary perspective view of an anisotropic fluid contact surface with asymmetrical prismoid asperities.
Figure 16E:
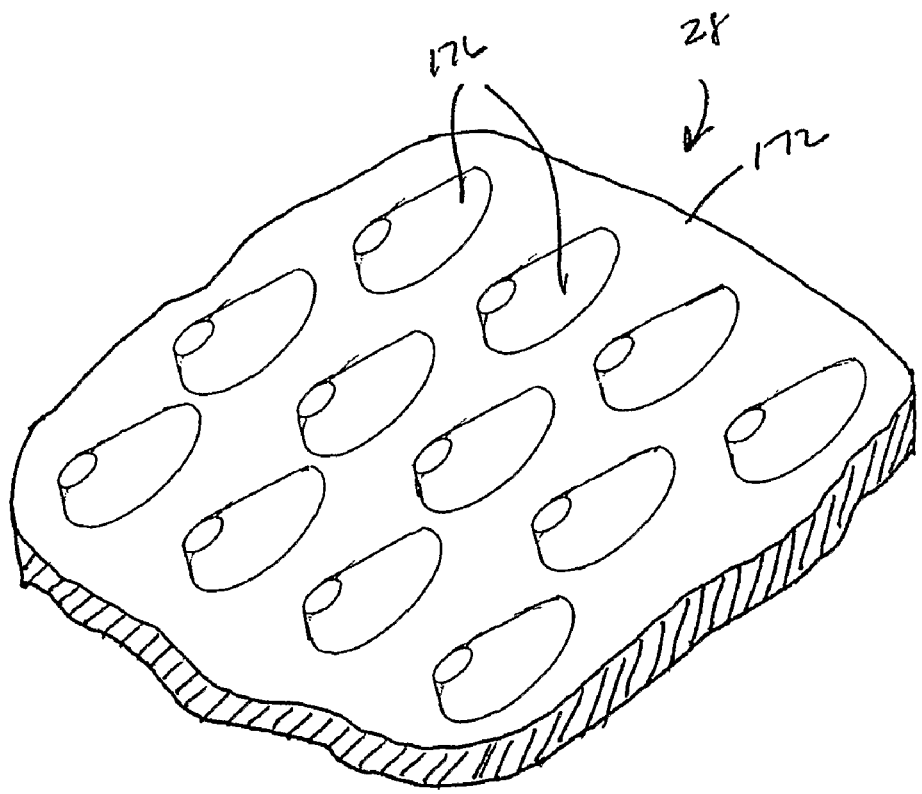
FIG. 16e is an enlarged fragmentary perspective view of an anisotropic fluid contact surface with asymmetrical frusto-conical asperities.

It will further be appreciated that an anisotropic wetting fluid contact surface 28 may include asymmetric features of a wide variety of shapes and disposed in a wide variety of patterns. For example, as depicted in FIG. 16*c*, anisotropic wetting fluid contact surface 28 may be formed by a succession of saw tooth ridges 170 on a substrate 172. In another example, as depicted in FIGS. 16*d* and 16*e*, prismoid 174 or frusto-conical 176 asperities may be disposed in a more or less regular pattern on the substrate 172. The asperities may also be virtually any other asymmetrical shape exhibiting opposing rise angles at variance with each other, including nearly any irregularly shaped three dimensional solid or cavity.

Figure 17:
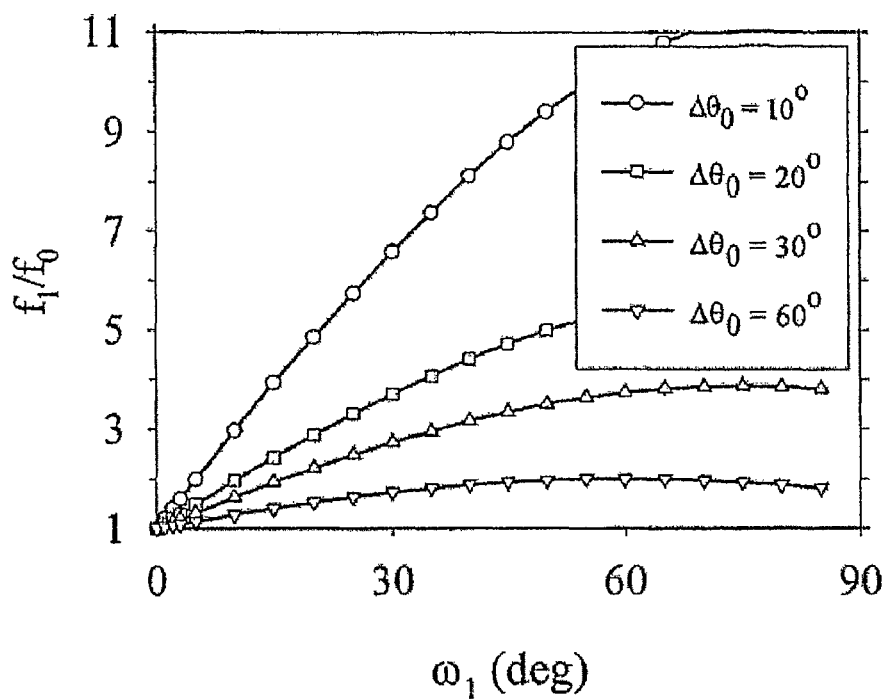
FIG. 17 is a graph of the ratio of retention forces of a surface with symmetric saw-tooth features relative to a corresponding smooth surface.

From the above examples, it will be appreciated by those of skill in the art that relations may be expressed for retention forces of any type of surface relative to any other type of surface. FIG. 17, for example depicts the ratio of the retention forces of a capillary tube with symmetric saw tooth features relative to the corresponding smooth tube for liquid/solid combinations with different levels of inherent hysteresis, $\Delta\theta_0$. Retention forces are present even if the surface of the tube is smooth and clean, i.e., $|f_0|$ is always >0. As $\omega_1$ increases and the surface of the tube becomes rougher, the relative retention force increases. For smaller $\omega_1$ values, the increase in $f_1/f_0$ is linear. In mathematical terms, if $\omega_1 + \frac{1}{2}\Delta\theta_0 \ll 1$, then equation (11) reduces to $$f_1/f_0 \approx 2\omega_1/\Delta\theta_0 + 1. \quad (13)$$

It will be appreciated from FIG. 17 and equation (13) that the larger the inherent hystersis in a system, the less influence the roughness of the surface will exert on the retention force. For example, using FIG. 17 to compare two capillary tubes of equal diameter, one with a smooth inner surface and the other with saw tooth features where $\omega_1 = 10°$, if the liquid and material of construction show an inherent hysteresis of $\Delta\theta_0 = 10°$, then retention force ratio is much larger ($f_1/f_0 = 2.97$) than if $\Delta\theta_0 = 30°$ ($f_1/f_0 = 1.63$).

Figure 18:
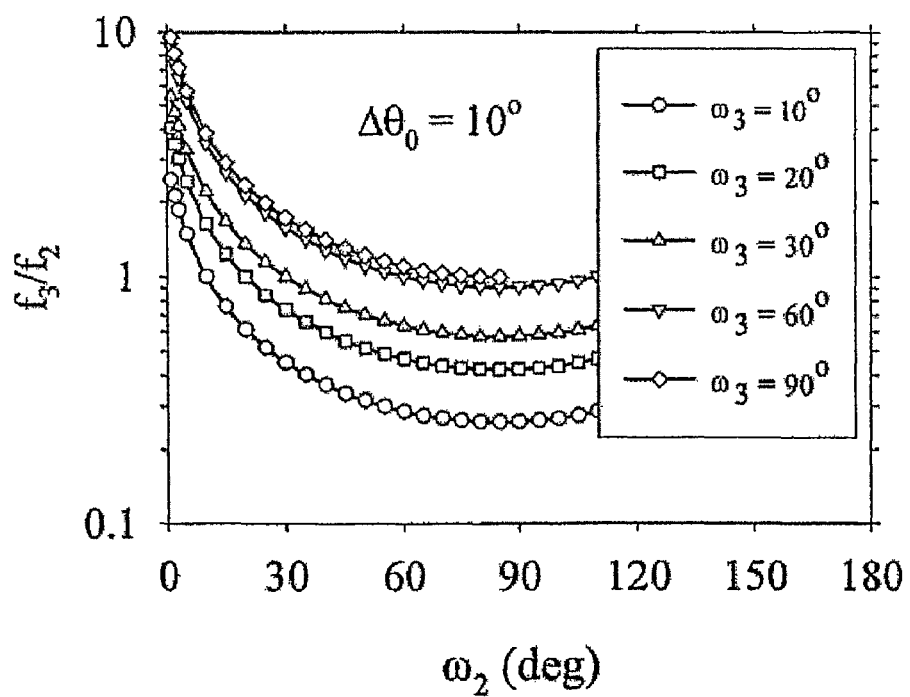
FIG. 18 is a graph of the ratio of retention forces of a surface with asymmetric saw-tooth features versus rise angle.

In another example, FIG. 18 depicts retention force ratios of a tube with asymmetric saw tooth features, $f_3/f_2$, plotted against $\omega_2$ for various $\omega_3$ values. Inherent hysteresis of the system is assumed to be $\Delta\theta_0 = 10°$. For a tube with ratchet-like structure where $\omega_2 = 45°$ and $\omega_3 = 90°$, $f_3/f_2 = 1.30$. The greater the difference between $\omega_2$ and $\omega_3$, the greater the disparity of the retention force in the two opposing directions; if $\omega_2 = 10°$ and $\omega_3 = 90°$, $f_3/f_2 = 3.85$. It is anticipated that a strong directional bias could also be created using shallow rise angles. If $\omega_2 = 1°$ and $\omega_3 = 10°$, then $f_3/f_2 = 2.48$. Alternatively, if $\omega_2 = 1°$ and $\omega_3 = 90°$, then $f_3/f_2 > 9$.

Figure 19:
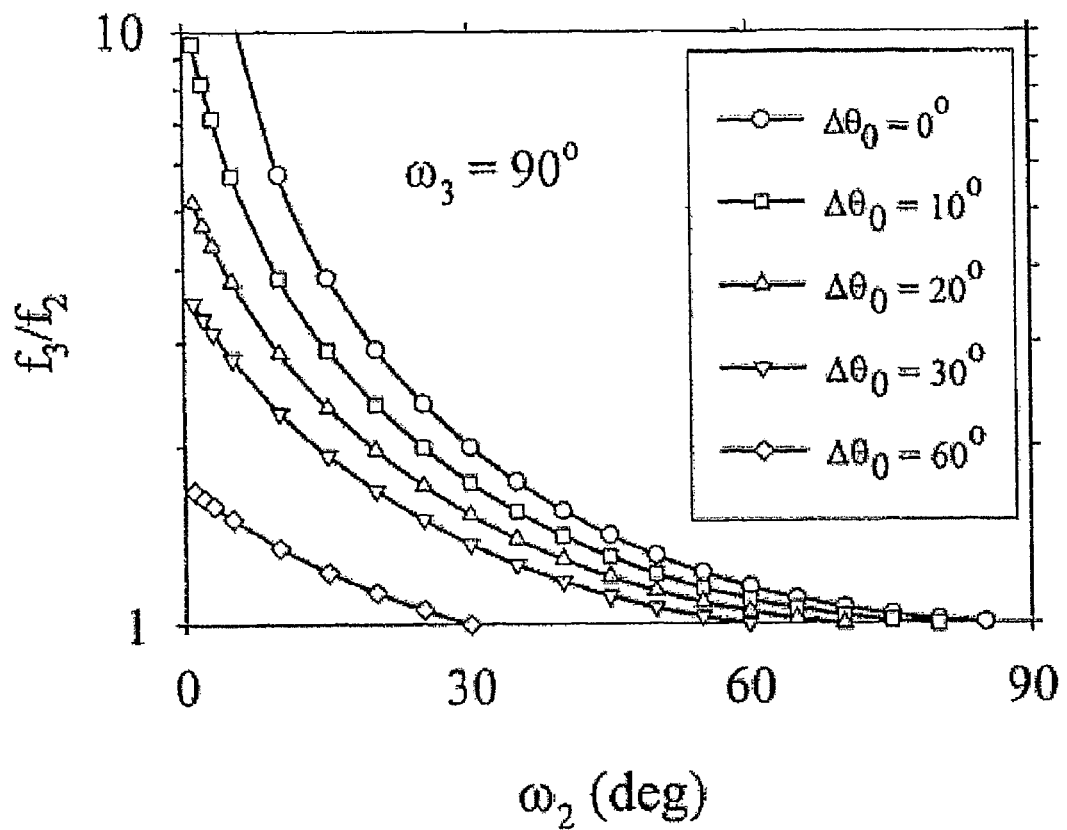
FIG. 19 is a graph of the ratio of retention forces of a surface with asymmetric saw-tooth features versus rise angle.

In yet another example, FIG. 19 depicts the variation in retention force ratios of a surface with asymmetric saw tooth features, $f_3/f_2$, versus rise angle, $\omega_2$, for different levels of inherent hysteresis, $\Delta\theta_0$. In this example, $\omega_3 = 90°$. As with the symmetric features, the retention force ratios are diminished by increases in $\Delta\theta_0$. For instance, in a capillary tube with asymmetric saw tooth features where $\omega_2 = 10°$ and $\omega_3 = 90°$, if the inherent hysteresis is $\Delta\theta_0 = 10°$, then retention force ratio of $f_3/f_2 = 3.85$. If $\Delta\theta_0$ increases to 30°, then $f_3/f_2$ falls to 2.29.

The above relations may also be practically used to gauge the absolute magnitude of retention forces of surfaces. For example, a water slug in a horizontal PTFE tube with smooth interior surfaces and a radius of R=1 mm exhibits an advancing contact angle of $\theta_{a,0} = 108°$ and inherent hysteresis of $\Delta\theta_0 = 10°$. In the tube without features depicted in FIG. 13*a*, the retention force that impedes displacement of the slug would be $f_0 = 77$ μN. Therefore, incipient motion of the water slug in either direction would require an external force >77 μN. If a fluid-liquid combination with a lower interfacial tension were employed, the retention forces would be less.

By introducing asymmetric saw tooth features with $\omega_2 = 10°$ and $\omega_3 = 90°$ on the inner surface of the PTFE tube as depicted in FIG. 13*c*, $\Delta f = 672$ μN. It is of course important to note that the external force to move the slug in either direction will be greater than the value for the smooth tube, $f_2=228$ μN and $f_3=900$ μN. Since the smaller retention force, $f_2$, is directed to the right, the slug will move easily to the left, FIG. 13(c). If the tube is made sufficiently small, the pressure differential to initiate movement is relatively large. For the PTFE tube described above ($\theta_{a,0}=108°$, $\Delta\theta_0=10°$, $\omega_2=10°$ and $\omega_3=90°$), if the tube diameter were shrunk to 20 μm, then the pressure differential to move a water slug in one direction versus the other would be approximately 20 kPa. Thus, this type of construction may be useful in valves or gates of microfluidic devices.

The size of the features are anticipated to be relatively unimportant for static slugs. Small features should produce the same directionally-biased wetting behavior as large ones. Once a slug begins to move, however, smaller features may have an advantage over larger ones. Smaller features would be less likely to disrupt flow. If too large, surface features could increase turbulence, thereby increasing flow resistance. Consequently, in some embodiments of the invention wherein anisotropic wetting fluid contact surfaces 28 may experience fluid flow, the average size of asperities forming anisotropic wetting fluid contact surfaces 28 may be generally less than 500 μm, in other embodiments generally less than 10 μm, and in still other embodiments less than 100 nm.

While the analysis here is aimed at capillary tubes with circular cross-sections, it also applies to non-circular tubes and sessile drops. Equation (1) differs only in the pre-factor k. Also, it will be appreciated by those of skill in the art that with the onset of flow, additional forces must be considered, such as those that arise from liquid viscosity, inertia or vertical displacement.

Figure 20:
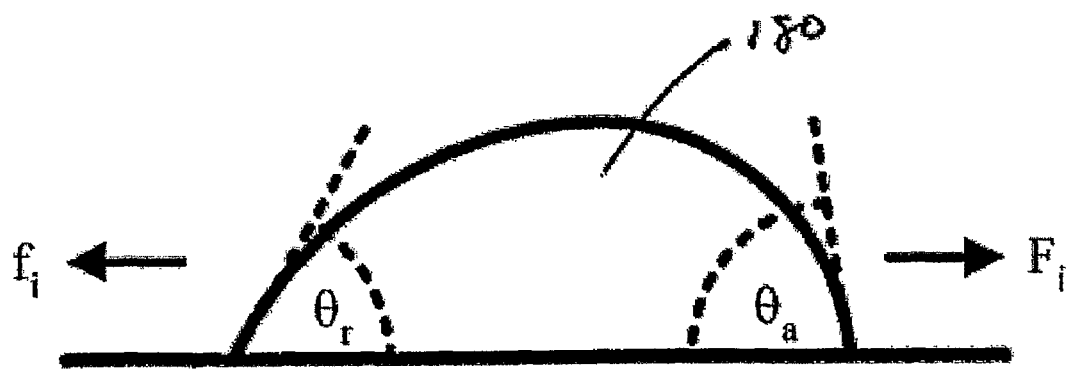
FIG. 20 is a side view of a sessile liquid drop at a critical condition where $F_i = f_i$.

FIG. 20 is a side view of a stationary sessile drop 180 under the influence of an external force, $F_i$. The external force distorts the shape of drop 180, causing it to "lean" forward. As depicted, drop 180 has reached a critical state where the retention and external force are equal, $f_i=F_i$. In this critical configuration the contact angle of the drop at the leading edge exhibits advancing value, $\theta_a$, and the trailing edge a receding value, $\theta_r$. If $F_i$ is increased slightly, drop 180 will begin to move. The general equation that describes the retention forces associated with a liquid slug in a capillary also describes the retention forces associated with sessile drops, $$f_i = k\gamma R(\cos\theta_r - \cos\theta_a), \quad (1)$$

where in this case, 2R is the drop width and the pre-factor, k, depends on the shape of the contact line. If the contact line of the sessile drop is circular, then $$k \approx 1.5 \quad (22)$$

If the drop elongates due to the external force, then k increases.

To initiate movement of a liquid slug in a small diameter capillary tube, a minimum external force must be applied to overcome the retention force associated with interfacial tension acting at the contact lines. The magnitude of the retention force increases with the fluid-liquid interfacial tension and surface roughness. If the surface roughness consists of symmetric features, then the increased resistance to incipient motion acts equally in both directions along the axis of the capillary and wetting will be isotropic If the features are asymmetric, then the retention force is less in one direction, and wetting will be anisotropic. The greater the asymmetry of the surface features, the greater the disparity of the retention force in the two opposing directions. With the appropriate design of surface features, the retention force differential Δf could exceed 5×. Liquid-solid combinations that show minimal inherent contact angle hysteresis would be expected to show the greater rectification.

Generally, the substrate material from which the fluid handling device is made may be any generally lyophobic or ultraphobic material upon which asymmetric micro or nano scale asperities may be suitably formed. The asperities may be formed directly in the substrate material itself, or in one or more layers of other material deposited on the substrate material, by photolithography or any of a variety of suitable methods. Microscale asperities according to the invention may be formed using known molding and stamping methods by texturing the tooling of the mold or stamp used in the process. The processes could include injection molding, extrusion with a textured calendar roll, compression molding tool, or any other known tool or method that may be suitable for forming microscale asperities.

Other methods that may be suitable for forming smaller scale asperities of the desired shape and spacing include nanomachining as disclosed in U.S. Patent Application Publication No. 2002/00334879, microstamping as disclosed in U.S. Pat. No. 5,725,788, microcontact printing as disclosed in U.S. Pat. No. 5,900,160, self-assembled metal colloid monolayers, as disclosed in U.S. Pat. No. 5,609,907, microstamping as disclosed in U.S. Pat. No. 6,444,254, atomic force microscopy nanomachining as disclosed in U.S. Pat. No. 5,252,835, nanomachining as disclosed in U.S. Pat. No. 6,403,388, sol-gel molding as disclosed in U.S. Pat. No. 6,530,554, self-assembled monolayer directed patterning of surfaces, as disclosed in U.S. Pat. No. 6,518,168, chemical etching as disclosed in U.S. Pat. No. 6,541,389, or sol-gel stamping as disclosed in U.S. Patent Application Publication No. 2003/0047822, all of which are hereby fully incorporated herein by reference. Carbon nanotube structures may also be usable to form the desired asperity geometries. Examples of carbon nanotube structures are disclosed in U.S. Patent Application Publication Nos. 2002/0098135 and 2002/0136683, also hereby fully incorporated herein by reference. Also, suitable asperity structures may be formed using known methods of printing with colloidal inks. Of course, it will be appreciated that any other method by which micro/nanoscale asperities may be accurately formed may also be used. A photolithography method that may be suitable for forming micro or nano scale asperities is disclosed in PCT Patent Application Publication WO 02/084340, hereby fully incorporated herein by reference.

It is anticipated that the anisotropic wetting surface of the present invention will be useful in myriad applications. For example, it is anticipated that if anisotropic wetting surfaces are applied on the wetted portions of fluid handling systems such as piping, tubing, fittings, valves and other devices, significant reduction in fluid friction and turbulence may be achieved. Effectiveness of critical cleaning processes may be improved by faster drying times and less chemical carryover residue remaining on the surface after drying. It is also anticipated that anisotropic wetting surfaces according to the present invention will be resistant to the growth of organisms in a bio-film on the surface, due in part to the greatly improved directional drainability of the surface.

Anisotropic wetting surface principles can be applied to ultraphobic surfaces as well. Ultra phobic wetting surface are described in the following U.S. patents and U.S. patent applications which are incorporated in their entirety by reference. U.S. patent application Ser. Nos. 10/824,340; 10/837,241; 10/454,743; 10/454,740 and U.S. Pat. No. 6,845,788. The disclosures of the above referenced applications and patent can be utilized along with the present application to design surface that demonstrate both and anisotropic wetting and ultraphobic properties.

The present invention may be embodied in other specific forms without departing from the central attributes thereof, therefore, the illustrated embodiments should be considered in all respects as illustrative and not restrictive, reference being made to the appended claims rather than the foregoing description to indicate the scope of the invention.

What is claimed is:

1. A fluid handling device having an anisotropic wetting surface portion, the anisotropic wetting surface portion comprising:

a substrate with a multiplicity of asymmetric substantially uniformly shaped microscale or nanoscale asperities thereon, each asperity defining a first asperity rise angle and a second opposing asperity rise angle relative to the substrate, the asperities being structured to present a retentive force ratio ($f_3/f_2$) greater or less than unity when the retentive force ratio ($f_3/f_2$) is determined according to the formula:

$$f_3/f_2 = \sin(\omega_3 + \tfrac{1}{2}\Delta\theta_0)/\sin(\omega_2 + \tfrac{1}{2}\Delta\theta_0)$$

where $\omega_2$ is the first asperity rise angle in degrees, $\omega_3$ is the second asperity rise angle in degrees, and $\Delta\theta_0 = (\theta_{a,0} - \theta_{r,0})$ where $\theta_{a,0}$ is a true advancing contact angle of a fluid in contact with the surface in degrees, and $\theta_{r,0}$ is a true receding contact angle of the fluid on the surface in degrees.

2. The fluid handling device of claim 1, wherein the asperities are projections.

3. The fluid handling device of claim 2, wherein the asperities are polyhedrally shaped.

4. The fluid handling device of claim 2, wherein each asperity has a generally square transverse cross-section.

5. The fluid handling device of claim 2, wherein the asperities are cylindrical, cylindroidal, conical or frusto-conical in shape.

6. The fluid handling device of claim 1, wherein the asperities are cavities formed in the substrate.

7. The fluid handling device of claim 1, wherein the asperities are positioned in a substantially uniform array.

8. The fluid handling device of claim 7, wherein the asperities are positioned in a rectangular array.

9. The fluid handling device of claim 1, wherein the fluid handling device is a microfluidic device.

10. The fluid handling device of claim 1, wherein the fluid handling device is a fuel cell component.

11. A method of providing an anisotropic wetting surface on a fluid handling device, the method comprising:

providing a fluid handling device presenting a surface; and disposing a multiplicity of substantially uniformly shaped microscale or nanoscale asperities on the surface of the fluid handling device to form the anisotropic wetting surface, each asperity having a first asperity rise angle and a second asperity rise angle relative to the surface, wherein the asperities are structured and disposed so as to present a retentive force ratio ($f_3/f_2$) greater or less than unity when the retentive force ratio ($f_3/f_2$) is determined according to the formula:

$$f_3/f_2 = \sin(\omega_3 + \tfrac{1}{2}\Delta\theta_0)/\sin(\omega_2 + \tfrac{1}{2}\Delta\theta_0)$$

where $\omega_2$ is the first asperity rise angle in degrees, $\omega_3$ is the second asperity rise angle in degrees, and $\Delta\theta_0 = (\theta_{a,0} - \theta_{r,0})$ where $\theta_{a,0}$ is a true advancing contact angle of a fluid in contact with the surface in degrees, and $\theta_{r,0}$ is a true receding contact angle of the fluid on the surface in degrees.

12. The process of claim 11, wherein the asperities are disposed using a photolithography process.

13. The process of claim 11, wherein the asperities are disposed using a process selected from the group consisting of nanomachining, microstamping, microcontact printing, self-assembling metal colloid monolayers, atomic force microscopy nanomachining, sol-gel molding, self-assembled monolayer directed patterning, chemical etching, sol-gel stamping, printing with colloidal inks, and disposing a layer of parallel carbon nanotubes on the substrate.

14. A fluid handling device comprising an anisotropic wetting surface with a multiplicity of asymmetric substantially uniformly shaped asperities thereon, each asperity defining a first asperity rise angle and a second opposing asperity rise angle relative to the substrate, the asperities being structured to present a retentive force ratio ($f_3/f_2$) greater or less than unity when the retentive force ratio ($f_3/f_2$) is determined according to the formula:

$$f_3/f_2 = \sin(\omega_3 + \tfrac{1}{2}\Delta\theta_0)/\sin(\omega_2 + \tfrac{1}{2}\Delta\theta_0)$$

where $\omega_2$ is the first asperity rise angle in degrees, $\omega_3$ is the second asperity rise angle in degrees, and $\Delta\theta_0 = (\theta_{a,0} - \theta_{r,0})$ where $\theta_{a,0}$ is a true advancing contact angle of a fluid in contact with the surface in degrees, and $\theta_{r,0}$ is a true receding contact angle of the fluid on the surface in degrees.

15. The fluid handling device of claim 14, wherein the fluid handling device is tubular in shape.

16. The fluid handling device of claim 14, wherein the fluid handling device is a valve.

17. The fluid handling device of claim 14, wherein the fluid handling device is a microfluidic device.

18. The fluid handling device of claim 1, wherein the fluid handling device is a fuel cell component.

19. A method of cleaning a fluid handling device, comprising:

providing a fluid handling device presenting an anisotropic wetting surface, the anisotropic wetting surface comprising a substrate with a multiplicity of asymmetric substantially uniformly shaped asperities thereon, each asperity defining a first asperity rise angle and a second opposing asperity rise angle relative to the substrate, the asperities being structured to present a retentive force ratio ($f_3/f_2$) greater or less than unity when the retentive force ratio ($f_3/f_2$) is determined according to the formula:

$$f_3/f_2 = \sin(\omega_3 + \tfrac{1}{2}\Delta\theta_0)/\sin(\omega_2 + \tfrac{1}{2}\Delta\theta_0)$$

where $\omega_2$ is the first asperity rise angle in degrees, $\omega_3$ is the second asperity rise angle in degrees, and $\Delta\theta_0 = (\theta_{a,0} - \theta_{r,0})$ where $\theta_{a,0}$ is a true advancing contact angle of a fluid in contact with the anisotropic wetting surface in degrees, and $\theta_{r,0}$ is a true receding contact angle of the fluid on the anisotropic wetting surface in degrees; and contacting the anisotropic wetting surface with the fluid.

20. The method of claim 19, further comprising imparting a force to the fluid handling device or the fluid to cause the fluid to move on the anisotropic wetting surface.

* * * * *